US010866973B2

(12) United States Patent
Barbas et al.

(10) Patent No.: US 10,866,973 B2
(45) Date of Patent: *Dec. 15, 2020

(54) TEST DATA MANAGEMENT (71) Applicant: International Business Machines Corporation, Armonk, NY (US)

(72) Inventors: Pedro M. Barbas, Dunboyne (IE); Konrad Emanowicz, Maynooth (IE); Enda McCallig, Robertstown (IE); Aslam F. Nomani, Markham (CA); Lei Pan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/834,180

(22) Filed: Dec. 7, 2017

(65) Prior Publication Data
US 2018/0096051 A1 Apr. 5, 2018

Related U.S. Application Data (63) Continuation of application No. 15/173,982, filed on Jun. 6, 2016.

(51) Int. Cl.
G06F 16/28 (2019.01)
G06F 11/36 (2006.01)
G06F 16/22 (2019.01)
G06F 16/23 (2019.01)

(52) U.S. Cl.
CPC ........ G06F 16/285 (2019.01); G06F 11/3684 (2013.01); G06F 16/221 (2019.01); G06F 16/2237 (2019.01); G06F 16/2365 (2019.01)

(58) Field of Classification Search
None
See application file for complete search history.

(56) References Cited

U.S. PATENT DOCUMENTS 9,201,911 B2 12/2015 Eker et al.
2002/0059187 A1 5/2002 Delo
2005/0240615 A1* 10/2005 Barsness ........... G06F 17/30498

(Continued)

OTHER PUBLICATIONS

IBM, "IBM InfoSphere Optim Test Data Management", IBM Software Solution Brief, IBM®, © Copyright IBM Corporation 2012, 6 pages.

(Continued)

Primary Examiner — Hau H Hoang
(74) Attorney, Agent, or Firm — Stephen R. Yoder (57) ABSTRACT As disclosed herein, a method includes receiving a plurality of datasets from a database, wherein each dataset comprises one or more data fields represented in a single data format, and wherein the data fields from at least two of the datasets are represented in different data formats, combining the plurality of datasets to provide a created data column corresponding to all of the data fields from the plurality of datasets, organizing the data column into data clusters, wherein each data cluster includes data fields represented in a single data format, and wherein each data field belongs to a data cluster, providing a key-value map referencing data fields with respect to their corresponding data formats, and verifying the database with respect to the created column. A corresponding computer program product and computer system are also disclosed.

6 Claims, 4 Drawing Sheets 330
165.32, 3234.43, 187.98, 2314.76, 721.21, 1677.44,
186.32, 2378.53, 546.43, 2912.53, 636.32, 9193.32,
894.43, 2546.23, 281.35, 9849.89, 3462.48

340A
167.32, 187.98, 721.2, 186.32,
546.43, 636.32, 894.43, 281.35

340B
3234.43, 2314.76, 1677.44, 2378.53, 2912.53,
9193.32, 2546.23, 9849.89, 3462.48

350
10101010101010100

(56) References Cited

U.S. PATENT DOCUMENTS

| | | |
|---|---|---|
| 2008/0263418 A1 | 10/2008 | Ward |
| 2012/0150820 A1 | 6/2012 | Sankaranarayanan |
| 2012/0265726 A1* | 10/2012 | Padmanabhan ....... G06F 17/303 707/602 |
| 2014/0007056 A1 | 1/2014 | Leizerovich et al. |
| 2014/0214900 A1* | 7/2014 | Barber .............. G06F 17/30294 707/801 |
| 2014/0237450 A1 | 8/2014 | Levy et al. |
| 2015/0106382 A1* | 4/2015 | Liu ...................... G06F 16/221 707/744 |

OTHER PUBLICATIONS

Barbas et al., "Test Data Management", U.S. Appl. No. 15/173,982, filed Jun. 6, 2016, 26 pages.

IBM Appendix P, list of patents or patent applications treated as related, 2017, 2 pages.

* cited by examiner

| costumer_total_buy ||
|---|---|
| numeric (3,2) | numeric (4,2) |
| 165.32 | 3234.43 |
| 187.98 | 2314.76 |
| 721.21 | 1677.44 |
| 186.32 | 2378.53 |
| 546.43 | 2912.53 |
| 636.32 | 9193.32 |
| 894.43 | 2546.23 |
| 281.35 | 9849.89 |
|  | 3462.48 |

315A { (left column)  315B } (right column)  — 310

TEST DATA MANAGEMENT

BACKGROUND OF THE INVENTION

The present invention relates generally to the field of database testing, and more specifically to managing test data fields.

In database testing, an important task is the generation of high-quality test data. Adequate test data will isolate defects and errors during various periods of software development and database testing. Typically, a data type for each column in a database is detailed up front when said database is created. The test data fields generated for a column are suitable for the specified data type associated with said column.

SUMMARY

As disclosed herein, a method includes receiving a plurality of datasets from a database, wherein each dataset comprises one or more data fields represented in a single data format, and wherein the data fields from at least two of the datasets are represented in different data formats, combining the plurality of datasets to provide a created data column corresponding to all of the data fields from the plurality of datasets, organizing the data column into data clusters, wherein each data cluster includes data fields represented in a single data format, and wherein each data field belongs to a data cluster, providing a key-value map referencing data fields with respect to their corresponding data formats, and verifying the database with respect to the created column. A corresponding computer program product and computer system are also disclosed.

DETAILED DESCRIPTION

The embodiments disclosed herein recognize that currently available techniques for generating test data for software testing do not address the challenge of managing test data where a data type has been changed after the creation of a database. Additionally, a test database system can take several weeks to be populated in order to satisfy all types of business requirements associated with the system, such as constraint satisfaction, cardinality and statistics satisfaction, and query satisfaction. As such, it is recognized that over time, using an initial test database design can become problematic. For example, if a testing data warehouse system uses a column as an INTEGER data type, but new business requirements need a NUMERIC data type for that column, a challenge can be presented if the new requirement must be merged into the active test data warehouse system. Consequently, the test data warehouse system is often dropped, recreated, and repopulated from scratch. The additional time and effort associated with these operations make it difficult to address quick agile testing cycles oriented for rapid deliveries. To address these challenges, the embodiments disclosed herein enable generating different test data fields (or test data records) that will be available in the same column under the same table.

Figure 1:
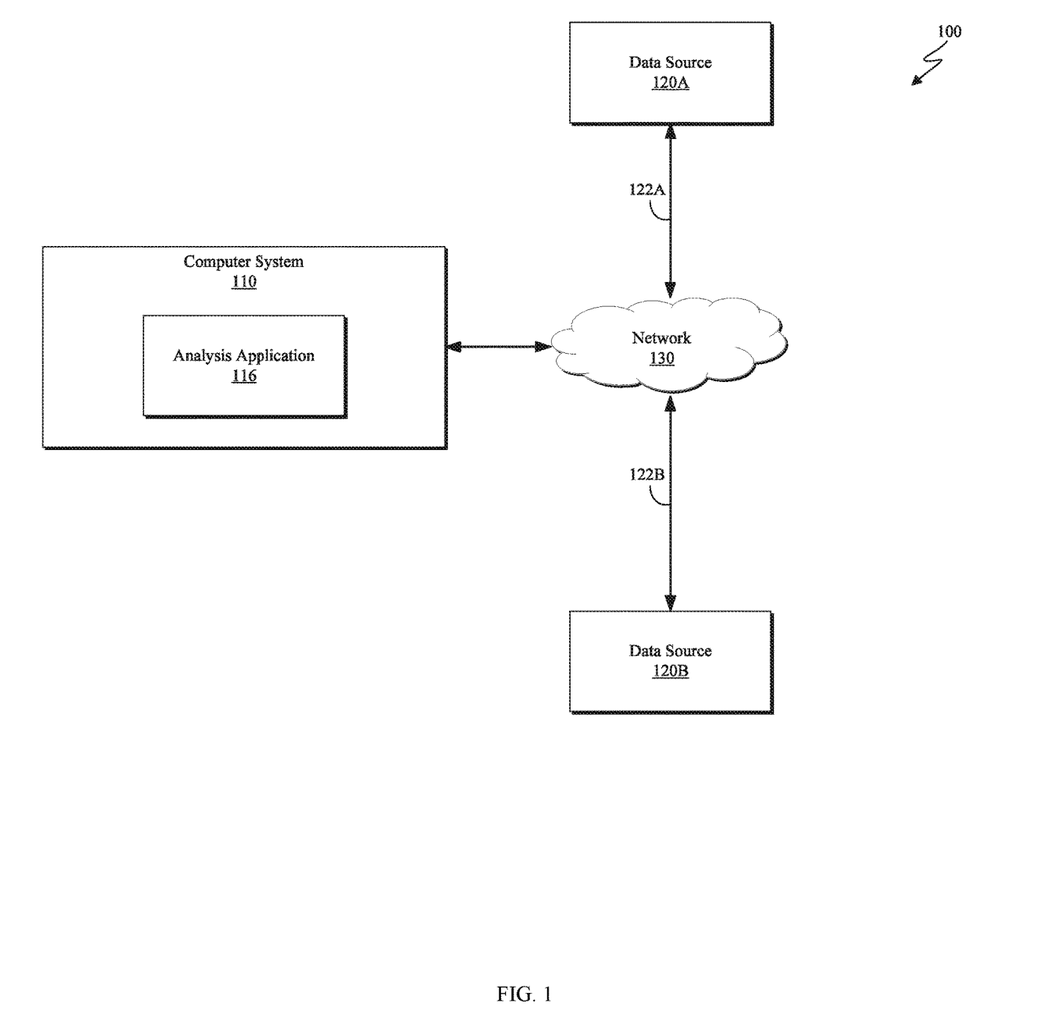
FIG. 1 is a block diagram depicting one embodiment of a data management system in accordance with some embodiments of the present invention.

FIG. 1 is a block diagram depicting one embodiment of a data management system 100 in accordance with some embodiments of the present invention. As depicted, data management system 100 includes a computer system 110 and data sources 120. Data management system 100 may enable adaptive test data management with multiple test data fields represented in different data types existing under the same column of a database system.

Computer system 110 can be a desktop computer, a laptop computer, a specialized computer server, or any other computer system known in the art. In some embodiments, computer system 110 represents a computer system utilizing clustered computers and components to act as a single pool of seamless resources. In general, computer system 110 is representative of any electronic device, or combination of electronic devices, capable of executing machine-readable program instructions, as described in greater detail with regard to FIG. 4. As depicted, computer system 110 is configured to receive data types 122 from data sources 120. In one or more embodiments, computer system 110 receives data types 122 from data sources 120 via network 130.

As depicted, computer system 110 includes data management application 115. Data management application 115 may be configured to execute a data management method configured to generate test data adequate for software testing. The details of one embodiment of a data management method executed by data management application 115 are discussed with respect to FIG. 2.

Data sources 120 may be any sources containing data that can be accessed by computer system 110. In some embodiments, data sources 120 correspond to databases. In other embodiments, data sources 120 may correspond to data tables from within a single database. While the depicted embodiment refers to two data sources 120, it should be appreciated that data sources 120 may be representative of any number of sources through which data is available to computer system 110. In at least one embodiment, data sources 120 are configured to provide data types 122 to computer system 110. Data sources 120 may be configured to provide data types 122 to computer system 110 via network 130.

Network 130 can be, for example, a local area network (LAN), a wide area network (WAN) such as the Internet, or a combination of the two, and include wired, wireless, or fiber optic connections. In general, network 130 can be any combination of connections and protocols that will support communications between data sources 120 and computer system 110 in accordance with an embodiment of the present invention.

Figure 2:
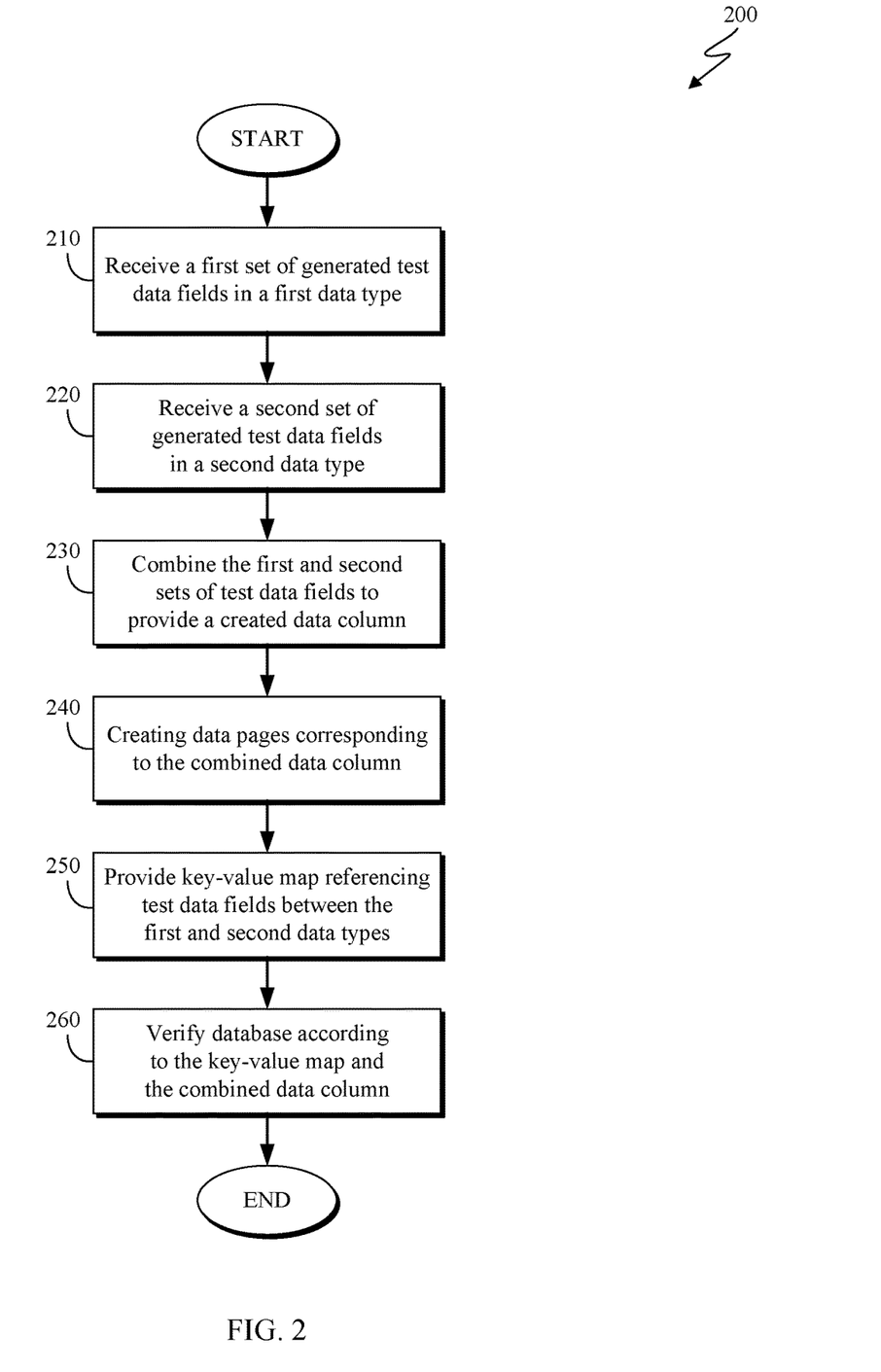
FIG. 2 is a flowchart depicting one embodiment of a data management method in accordance with at least one embodiment of the present invention.

FIG. 2 is a flowchart depicting one embodiment of a data management method 200 in accordance with at least one embodiment of the present invention. As depicted, data management method 200 includes receiving (210) a first set of test data fields, receiving (220) a second set of test data fields, combining (230) the first set of test data fields and the second set of test fields, creating (240) data pages corresponding to the combined data column, providing (250) a key-value map referencing test data fields between the first and second data types, and verifying (260) a database according to the combined column. Data management method 200 may enable adaptive test data management with multiple test data fields of different data types running under the same column of a database system. The present invention will now be discussed with respect to FIG. 2 and the associated sample data in FIG. 3A and FIG. 3B.

Receiving (210) a first set of test data fields may include receiving one or more test data fields corresponding to a data table within a database system. In one embodiment, receiving (210) a first set of test data fields includes receiving one or more test data fields, wherein the test data fields conform to one of two data types. In said embodiment, receiving (210) a first set of test data fields may include identifying which of the received one or more test data fields adheres to a first data type. The identified test data fields may be compiled into a first set of test data fields that adhere to the first data type. In one or more embodiments, the test data fields correspond to multiple data pages in a test data column.

Receiving (220) a second set of test data fields may include receiving one or more test data fields corresponding to a data table within a database system. In one embodiment, receiving (220) a second set of test data fields includes receiving one or more test data fields, wherein the test data fields conform to one of two data types. In said embodiment, receiving (220) a second set of test data fields may include identifying which of the received one or more test data fields adheres to a second data type. The identified test data fields may be compiled into a second set of test data fields that adhere to the second data type. In one or more embodiments, the test data fields correspond to multiple data pages in the same test data column as the first set of test data fields.

Figure 3A:
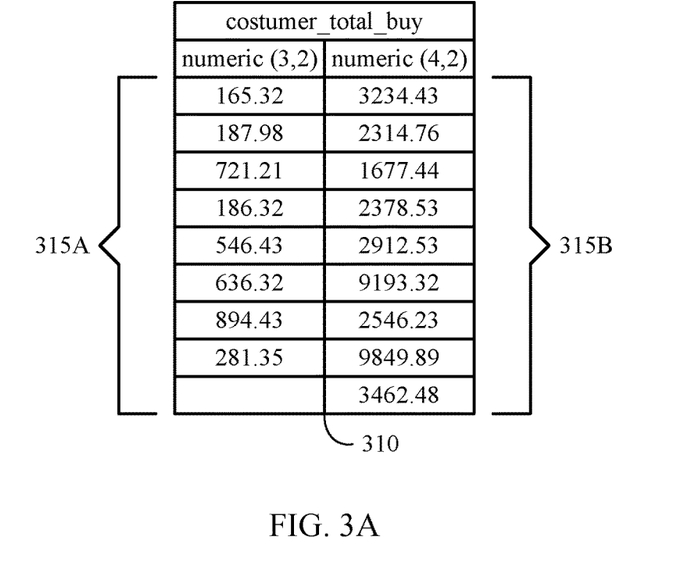
FIG. 3A depicts an example dataset in accordance with one embodiment of the present invention.

Referring now to FIG. 3A, FIG. 3A depicts an example data table 310 in accordance with one embodiment of the present invention. The data table 310 includes a label identifying what variable (in this case, costumer_total_buy) the included data corresponds to. Data table 310 is one example of a set of test data fields which may correspond to the two sets of test data fields received via data management method 200.

As depicted, data table 310 comprises two columns. The first column comprises data of data type NUMERIC(3,2), and the second column comprises data of data type NUMERIC(4,2). A data entry of format NUMERIC(X,Y) is a numeric value with X integers to the left of a decimal point and Y integers to the right of the decimal point. Data table 310 comprises 9 rows, each row comprising one data entry of format NUMERIC(3,2) and one data entry of format NUMERIC(4,2). As depicted, the last row includes a blank entry in the NUMERIC(3,2) column, as there are fewer data entries of this format in data table 310. The data in data table 310 can be considered two datasets 315, with set 315A corresponding to data values of format NUMERIC(3,2) and set 315B corresponding to data values of format NUMERIC(4,2).

Combining (230) the first set of test data fields and the second set of test data fields may include merging the first set of test data fields and the second set of test data fields into a single column of test data fields. In one embodiment, combining (230) sets of test data fields includes building a column of test data fields that preserves the row order of the first set of test data fields and the second set of test data fields. Maintaining the row order allows different test data fields to keep the same order in a row, which eliminates the need to maintain a row pointer for the data column. Combining (230) the sets of test data fields may further include storing the column of test data fields in a data store.

Figure 3B:
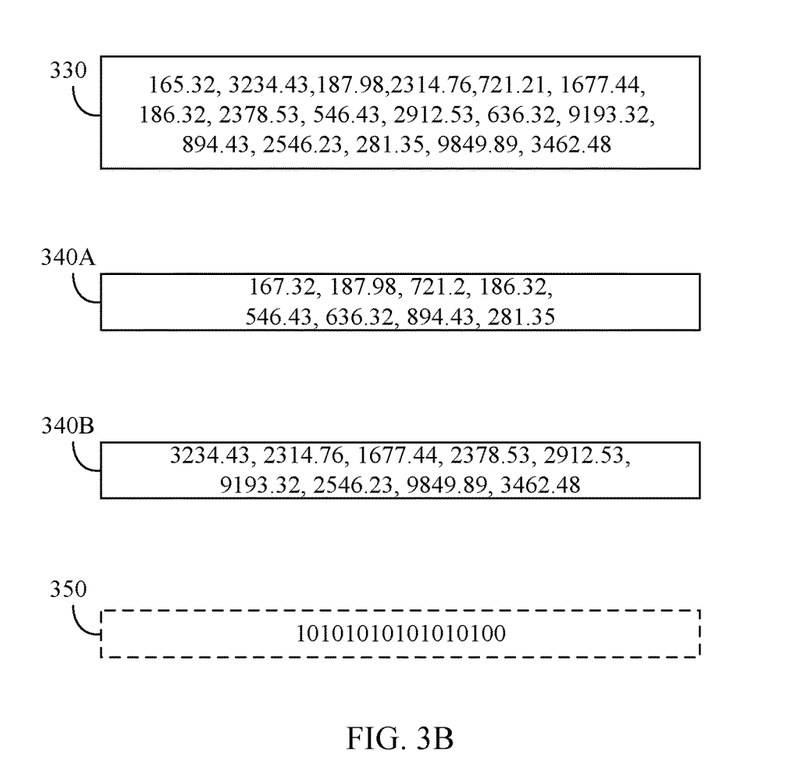
FIG. 3B depicts an exemplary set of data fields as well as two data clusters and a key value map in accordance with one embodiment of the present invention.

With respect to FIG. 3B, an exemplary set of data fields 330 in accordance with one embodiment of the present invention is depicted. The set of data fields 330 corresponds to data stored in data table 310 depicted with respect to FIG. 3A. The set of data fields 330 contains data that adheres to one of two distinct data forms, and is an example of the type of data set which may be managed using a data management method such as data management method 200. The set of data fields 330 is an example of a created data column, wherein the column was created by combining the data fields from two datasets.

Creating (240) data pages corresponding to the data column may include splitting the data tables into clusters. In one or more embodiments, each cluster of data fields includes only data fields of a single type. Splitting the data fields into clusters in this manner does not impact statement effectiveness with respect to the data fields, while also enabling compatibility among different test data fields in the workload. In one or more embodiments, creating (240) data pages corresponding to the data column further includes creating the clusters in an order that maintains the row order from the initial data sets. Each cluster of data fields may be saved as a data page. Providing (250) a key-value map referencing original test data fields may occur concurrently with creating (240) data pages corresponding to the data column.

Referring again to FIG. 3B, the set of data fields 330 contains 17 data fields, as depicted. Each of these data fields is either of the form DECIMAL(3,2) or DECIMAL(4,2), which enables the data fields to be divided into two data clusters 340A and 340B. As depicted, data cluster 340A comprises only data of form DECIMAL(3,2), and data cluster 340B comprises only data of form DECIMAL(4,2). The clusters 340 may be stored along with the set of data fields 330. These data clusters 340 may be saved as data pages, wherein a data page for each cluster indicates which data fields belong to each cluster.

Providing (250) a key-value map referencing test data fields in the created column may include creating a key-value map referencing test data fields between two data pages. In one embodiment, providing (250) a key-value map includes creating a map referencing which data page (or cluster) a test data field belongs to. The key-value map may be implemented as an array maintained with the initial test data fields. In at least one embodiment, the key-value map is saved in a form such that each bit of the map corresponds to a distinct entry of the created column.

Referring again to FIG. 3B, depicted is a key-value map 350 corresponding to the data fields in the set of data fields 330. As depicted, key-value map 350 is implemented as an array where the content is saved in the form of bits corresponding to each column. In the depicted embodiment, the key-value map 350 maps the data fields from the set of data 330 into one of the two clusters 340. There are 17 entries in key-value map 350, corresponding to the 17 data fields from the set of data 330. The first entry in the key-value map 350 corresponds to the first data field in the set of data 330, the second entry in the key-value map corresponds to the second data field in the set of data 330, and so on. With respect to the depicted embodiment, a value of "1" in the key-value map 350 indicates that the corresponding data field is of data type NUMERIC(3,2), and the entry therefore belongs to cluster 340A. A value of "0" in the key-value map 350 indicates that the corresponding data field is of data type NUMERIC(4,2), and the entry therefore belongs to cluster 340B. Key-value map 350 may also be stored alongside the clusters 340 and the set of data fields 330.

Verifying (260) the database with respect to the created column may include executing a database testing method configured to verify the integrity of the database. In some embodiments, verifying (260) the database includes executing one or more database operations to verify that the database is capable of carrying out the associated commands. By creating a column comprising multiple types of data fields, the database operations can be tested on a variety of data types to enable comprehensive verification. Verifying (260) the database may further include providing an indicator of the database's validity to a user.

Figure 4:
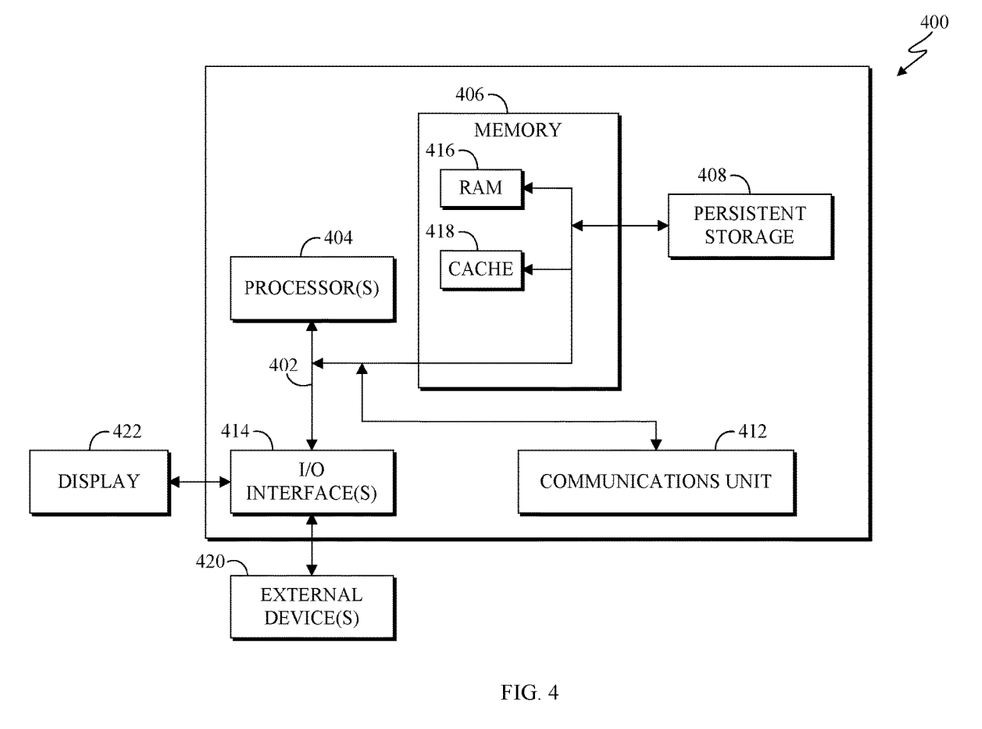
FIG. 4 depicts a block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    receiving a plurality of datasets from a database, wherein each dataset comprises one or more data fields represented in a single data format, and wherein the data fields from at least two of the datasets are represented in different data formats;
    combining the plurality of datasets to provide a created data column corresponding to all of the data fields from the plurality of datasets;
    organizing the created data column into data clusters, wherein each data cluster includes data fields represented in a single data format, and wherein each data field belongs to a data cluster;
    providing a key-value map referencing data fields with respect to their corresponding data formats wherein the key-value map is saved in a format such that each bit of the key-value map corresponds to a distinct entry of the created column; and
    verifying the database with respect to the created data column by:
        executing one or more database operations utilizing data from the created data column to confirm that the database is functional relative to the executed one or more database operations and the different data formats represented in the created data column.

2. The method of claim 1, wherein the plurality of datasets correspond to datasets from a single data table in the database.

3. The method of claim 1, wherein each data cluster is saved as a data page indicating which data fields belong to said cluster.

4. The method of claim 1, wherein verifying a database with respect to the created column comprises executing a set of database operations on the data fields in the created column.

5. The method of claim 4, wherein verifying a database with respect to the created column further includes providing an indicator of the database's validity.

6. The method of claim 1, wherein the key-value map is implemented as an array maintained with one or more initial test data fields.

\* \* \* \* \*